(12) United States Patent
Huang et al.

(10) Patent No.: US 11,175,478 B2
(45) Date of Patent: Nov. 16, 2021

(54) OPTICAL IMAGING SYSTEM HAVING LENSES OF −+−+ REFRACTIVE POWERS

(71) Applicant: ZHEJIANG SUNNY OPTICAL CO., LTD., Ningbo (CN)

(72) Inventors: Lin Huang, Ningbo (CN); Xinquan Wang, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 262 days.

(21) Appl. No.: 16/293,112

(22) Filed: Mar. 5, 2019

(65) Prior Publication Data
US 2019/0196147 A1    Jun. 27, 2019

Related U.S. Application Data

(63) Continuation of application No. PCT/CN2018/086741, filed on May 14, 2018.

(51) Int. Cl.
| | |
|---|---|
| *G02B 13/00* | (2006.01) |
| *G02B 9/34* | (2006.01) |
| *G02B 5/20* | (2006.01) |
| *G02B 13/14* | (2006.01) |

(52) U.S. Cl.
CPC ........... *G02B 13/004* (2013.01); *G02B 5/208* (2013.01); *G02B 9/34* (2013.01); *G02B 13/14* (2013.01)

(58) Field of Classification Search
CPC ........ G02B 13/004; G02B 13/14; G02B 9/34; G02B 5/208
See application file for complete search history.

(56) References Cited

U.S. PATENT DOCUMENTS

| | | | |
|---|---|---|---|
| 2013/0155526 A1 | 6/2013 | Hsieh et al. | |
| 2014/0078581 A1 | 3/2014 | Tsai et al. | |
| 2017/0227742 A1* | 8/2017 | Hsieh | ........... G02B 27/027 |
| 2017/0276905 A1 | 9/2017 | Lai et al. | |
| 2019/0369364 A1* | 12/2019 | Shobayashi | ........... G02B 13/04 |

FOREIGN PATENT DOCUMENTS

| | | |
|---|---|---|
| CN | 106680976 A | 5/2017 |
| CN | 107167901 A | 9/2017 |
| CN | 107219610 A | 9/2017 |
| CN | 207663139 U | 7/2018 |
| JP | 2002072095 A | 3/2002 |

\* cited by examiner

*Primary Examiner* — Wen Huang
(74) *Attorney, Agent, or Firm* — Barnes & Thornburg LLP

(57) ABSTRACT

The present disclosure discloses an optical imaging system. The imaging system sequentially includes, from an object side to an image side along an optical axis: a first lens, a second lens, a third lens, and a fourth lens. The first lens has a negative refractive power; the second lens has a positive refractive power or a negative refractive power; the third lens has a positive refractive power or a negative refractive power, and an image-side surface of the third lens is a concave surface; the fourth lens has a positive refractive power, and an image-side surface of the fourth lens is a concave surface. A total effective focal length f of the optical imaging system and an entrance pupil diameter EPD of the optical imaging system satisfy: $f/EPD \leq 1.60$.

12 Claims, 9 Drawing Sheets

OPTICAL IMAGING SYSTEM HAVING LENSES OF −+−+ REFRACTIVE POWERS

CROSS-REFERENCE TO RELATED APPLICATIONS

This is a continuation of International Application PCT/CN2018/086741, with an international filing date of May 14, 2018, which claims priorities and rights to Chinese Patent Application No. 201711311255.X filed with the China National Intellectual Property Administration (CNIPA) on Dec. 11, 2017 and Chinese Patent Application No. 201721711746.9 filed with the CNIPA on Dec. 11, 2017, the disclosures of which are hereby incorporated by reference in their entireties.

TECHNICAL FIELD

The present disclosure relates to an optical imaging system, and more specifically to an optical imaging system including four lenses.

BACKGROUND

With the development of chip technologies such as the charge-coupled device (CCD) or the complementary metal-oxide semiconductor (CMOS) element, their applications extend to fields such as infrared imaging, distance detection, and infrared recognition. At the same time, with the continuous development of portable electronic products, corresponding requirements have been put forward for miniaturization of the counterpart optical imaging systems.

Existing miniaturized optical imaging systems generally have a large aperture number (F-number), and a small amount of light passing through may result in poor imaging performance. Therefore, there is a need for an optical imaging system that has miniaturization, large aperture characteristics, and is capable of imaging based on the infrared bandwave, in order to ensure the application of the optical imaging system in the fields such as detection and recognition.

SUMMARY

The present disclosure provides an optical imaging system applicable to portable electronic products and may at least solve or partially solve at least one of the above disadvantages in the existing technology.

According to an aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. A total effective focal length f of the optical imaging system and an entrance pupil diameter EPD of the optical imaging system may satisfy: $f/EPD \leq 1.60$.

In an implementation, the optical imaging system may further include an infrared bandpass filter disposed between the fourth lens and an image plane of the optical imaging system, and a bandpass waveband of the infrared bandpass filter may be 750 nm to 1000 nm.

In an implementation, the bandpass waveband of the infrared bandpass filter may be 850 nm to 940 nm.

In an implementation, a distance TTL from a center of an object-side surface of the first lens to an image plane of the optical imaging system on the optical axis and the entrance pupil diameter EPD of the optical imaging system may satisfy: $1.0 < TTL/EPD < 2.5$.

In an implementation, a distance TTL from a center of an object-side surface of the first lens to an image plane of the optical imaging system on the optical axis and a sum of spacing distances $\Sigma AT$ of any two adjacent lenses among the first lens to the fourth lens on the optical axis may satisfy: $3.5 < TTL/\Sigma AT < 5.0$.

In an implementation, a center thickness CT1 of the first lens on the optical axis and a center thickness CT4 of the fourth lens on the optical axis may satisfy: $1.0 < CT4/CT1 < 3.5$.

In an implementation, an effective focal length f1 of the first lens and the total effective focal length f of the optical imaging system may satisfy: $-4.0 < f1/f < -2.0$.

In an implementation, an effective focal length f4 of the fourth lens and an effective focal length f2 of the second lens may satisfy: $0 < f4/f2 < 1.5$.

In an implementation, an effective focal length f3 of the third lens and a radius of curvature R5 of an object-side surface of the third lens may satisfy: $-1 < f3/R5 < 0.5$.

In an implementation, a radius of curvature R7 of an object-side surface of the fourth lens and a radius of curvature R8 of the image-side surface of the fourth lens may satisfy: $-5.0 < (R7+R8)/(R7-R8) < -1.0$.

In an implementation, an effective focal length f2 of the second lens and a center thickness CT2 of the second lens on the optical axis may satisfy: $5.0 < f2/CT2 < 10.0$.

In an implementation, a radius of curvature R1 of the object-side surface of the first lens and a radius of curvature R2 of an image-side surface of the first lens may satisfy: $4.0 < |R1+R2|/|R1-R2| < 7.0$.

In an implementation, the total effective focal length f of the optical imaging system, an effective focal length f3 of the third lens, and an effective focal length f4 of the fourth lens may satisfy: $1.0 < |f/f3| + |f/f4| < 4.0$.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. A distance TTL from a center of an object-side surface of the first lens to an image plane of the optical imaging system on the optical axis and an entrance pupil diameter EPD of the optical imaging system may satisfy: $1.0 < TTL/EPD < 2.5$.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. A distance TTL from a center of an object-side surface of the first lens to an image plane of the optical imaging system on the optical axis and a sum of spacing distances ΣAT of any two adjacent lenses among the first lens to the fourth lens on the optical axis may satisfy: 3.5<TTL/ΣAT<5.0.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. A center thickness CT1 of the first lens on the optical axis and a center thickness CT4 of the fourth lens on the optical axis may satisfy: 1.0<CT4/CT1<3.5.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. An effective focal length f1 of the first lens and a total effective focal length f of the optical imaging system may satisfy: −4.0<f1/f<−2.0.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. An effective focal length f4 of the fourth lens and an effective focal length f2 of the second lens may satisfy: 0<f4/f2<1.5.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. An effective focal length f3 of the third lens and a radius of curvature R5 of an object-side surface of the third lens may satisfy: −1<f3/R5<0.5.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. A radius of curvature R7 of an object-side surface of the fourth lens and a radius of curvature R8 of the image-side surface of the fourth lens may satisfy: −5.0<(R7+R8)/(R7−R8)<−1.0.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. An effective focal length f2 of the second lens and a center thickness CT2 of the second lens on the optical axis may satisfy: 5.0<f2/CT2<10.0.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. A radius of curvature R1 of an object-side surface of the first lens and a radius of curvature R2 of an image-side surface of the first lens may satisfy: 4.0<|R1+R2|/|R1−R2|<7.0.

According to another aspect, the present disclosure relates to an optical imaging system. The imaging system sequentially includes, from an object side to an image side along an optical axis: a first lens, a second lens, a third lens, and a fourth lens. The first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. A total effective focal length f of the optical imaging system, an effective focal length f3 of the third lens, and an effective focal length f4 of the fourth lens may satisfy: 1.0<|f/f3|+|f/f4|<4.0.

In the present disclosure, a plurality of lenses (e.g., four lenses) are used. By reasonably distributing the refractive powers and the surface types of the lenses, the center thicknesses of the lenses and the spacing distances between the lenses, the optical imaging system has at least one advantageous effect of ultra-thin, miniaturization, high imaging quality and imaging based on infrared waveband, or the like.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings.

DETAILED DESCRIPTION OF EMBODIMENTS

Figure 1:
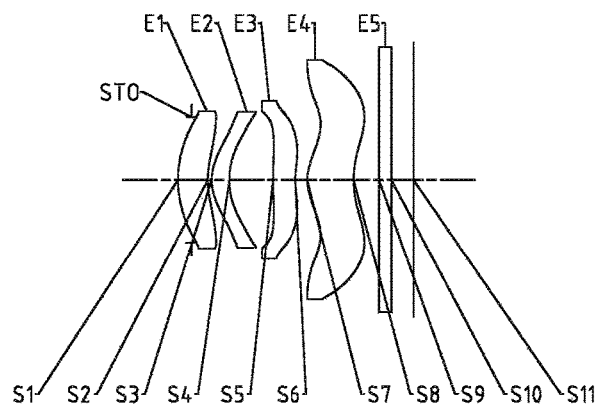
FIG. 1 is a schematic structural diagram illustrating an optical imaging system according to Embodiment 1 of the present disclosure.

For a better understanding of the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the identical reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area near the optical axis. If the surface of a lens is a convex surface and the position of the convex surface is not defined, it indicates that the surface of the lens is convex at least at the paraxial area; if the surface of a lens is a concave surface and the position of the concave surface is not defined, it indicates that the surface of the lens is concave at least at the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The optical imaging system according to exemplary implementations of the present disclosure may include, for example, four lenses having refractive powers, that is, a first lens, a second lens, a third lens, and a fourth lens. The four lenses are sequentially arranged from an object side to an image side along an optical axis.

In an exemplary implementation, the first lens may have a negative refractive power; the second lens has a positive refractive power or a negative refractive power; the third lens has a positive refractive power or a negative refractive power, and an image-side surface of the third lens may be a concave surface; and the fourth lens may have a positive refractive power, and an image-side surface of the fourth lens may be a concave surface. The first lens having a negative refractive power is beneficial for reducing the angle between the light and the optical axis when it converges on the image plane, and improving the energy density of the image point. The second lens having the refractive power, the third lens having the refractive power and the image-side surface of the third lens being a concave surface are beneficial for correcting the astigmatism of the imaging system and improving the imaging quality. The fourth lens having the positive refractive power is beneficial for reducing the angle between the light and the optical axis when it converges on the image plane, and improving the energy density of the image point. The image-side surface of the fourth lens being a concave surface is beneficial for further correcting the astigmatism and curvature of field and improving the imaging quality.

In an exemplary implementation, an object-side surface of the first lens may be a convex surface, and an image-side surface of the first lens may be a concave surface.

In an exemplary implementation, the second lens may have a positive refractive power, an object-side surface of the second lens may be a convex surface, and an image-side surface of the second lens may be a concave surface.

In an exemplary implementation, the third lens may have a negative refractive power.

In an exemplary implementation, an object-side surface of the fourth lens may be a convex surface.

In an exemplary implementation, the optical imaging system of the present disclosure may satisfy the conditional expression: $f/EPD \leq 1.60$, here, f is the total effective focal length of the optical imaging system, and EPD is the entrance pupil diameter of the optical imaging system. More specifically, f and EPD may further satisfy: $1.34 \leq f/EPD \leq 1.58$. Satisfying the conditional expression of $f/EPD \leq 1.60$ may effectively improve the energy density of the image plane and improve the signal-to-noise ratio of the output signal from the image-side sensor (i.e., the infrared imaging quality or the recognition or detection accuracy).

In an exemplary implementation, the optical imaging system of the present disclosure may satisfy the conditional expression: $1.0 < TTL/EPD < 2.5$, here, TTL is the distance of the center of the object-side surface of the first lens to the image plane of the optical imaging system on the optical axis, and EPD is the entrance pupil diameter of the optical imaging system. More specifically, TTL and EPD may further satisfy: $1.7 < TTL/EPD < 2.3$, for example, $1.88 \leq TTL/EPD \leq 2.23$. Satisfying the conditional expression of $1.0 < TTL/EPD < 2.5$ is beneficial for achieving a short total track length TTL while achieving a large aperture, and is advantageous for improving the imaging quality.

In an exemplary implementation, the optical imaging system of the present disclosure may satisfy the conditional expression: $1.0 < CT4/CT1 < 3.5$, here, CT1 is the center thickness of the first lens on the optical axis and CT4 is the center thickness of the fourth lens on the optical axis. More specifically, CT1 and CT4 may further satisfy: $1.5 < CT4/CT1 < 3.5$, for example, $1.56 \leq CT4/CT1 \leq 3.41$. Satisfying the conditional expression of $1.0 < CT4/CT1 < 3.5$ is beneficial to the reasonable distribution of the thicknesses of the lenses, making the lenses easy to be injection-molded and improving the processability of the imaging system.

In an exemplary implementation, the optical imaging system of the present disclosure may satisfy the conditional expression: $-4.0 < f1/f < -2.0$, here, f1 is the effective focal length of the first lens, and f is the total effective focal length of the optical imaging system. More specifically, f1 and f may further satisfy: $-3.81 \leq f1/f \leq -2.26$. Satisfying the conditional expression of $-4.0 < f1/f < -2.0$ is beneficial for reducing the angle between the light and the optical axis when the light converges on the image plane, and improving the energy density of the image point; at the same time, it is beneficial for achieving a better imaging quality.

In an exemplary implementation, the optical imaging system of the present disclosure may satisfy the conditional expression: $0 < f4/f2 < 1.5$, here, f4 is the effective focal length of the fourth lens, and f2 is the effective focal length of the second lens. More specifically, f4 and f2 may further satisfy: $0 < f4/f2 < 1.1$, for example, $0.48 \leq f4/f2 \leq 1.05$. Satisfying the conditional expression of $0 < f4/f2 < 1.5$ may balance the refractive power distribution to avoid the tolerance sensitivity of the system from being sensitive due to the excessive concentration of the refractive powers in the optical path.

In an exemplary implementation, the optical imaging system of the present disclosure may satisfy the conditional expression: $-1 < f3/R5 < 0.5$, here, f3 is the effective focal length of the third lens, and R5 is the radius of curvature of the object-side surface of the third lens. More specifically, f3 and R5 may further satisfy: $-0.8 < f3/R5 < 0.3$, for example, $-0.65 \leq f3/R5 \leq 0.16$. Satisfying the conditional expression $-1 < f3/R5 < 0.5$ is advantageous for the processing and manufacturing of the third lens.

In an exemplary implementation, the optical imaging system of the present disclosure may satisfy the conditional expression: $-5.0 < (R7+R8)/(R7-R8) < -1.0$, here, R7 is the radius of curvature of the object-side surface of the fourth lens, and R8 is the radius of curvature of the image-side surface of the fourth lens. More specifically, R7 and R8 may further satisfy: $-4.7 < (R7+R8)/(R7-R8) < -1.5$, for example, $-4.57 \leq (R7+R8)/(R7-R8) \leq -1.62$. Satisfying the conditional expression $-5.0 < (R7+R8)/(R7-R8) < -1.0$ is beneficial for reducing the effective aperture (F-number) when the light converges on the image plane, increasing the effective energy density on the image plane, and improving the imaging quality or the recognition or detection accuracy of the imaging system.

In an exemplary implementation, the optical imaging system of the present disclosure may satisfy the conditional expression: $5.0 < f2/CT2 < 10.0$, here, f2 is the effective focal length of the second lens, and CT2 is the center thickness of the second lens on the optical axis. More specifically, f2 and CT2 may further satisfy: $5.5 < f2/CT2 < 9.5$, for example, $5.58 \leq f2/CT2 \leq 9.26$. Satisfying the conditional expression $5.0 < f2/CT2 < 10.0$ is beneficial for improving the lens assembly stability and the consistency of mass production, and is beneficial for improving the production yield of the optical imaging system.

In an exemplary implementation, the optical imaging system of the present disclosure may satisfy the conditional expression: $4.0 < |R1+R2|/|R1-R2| < 7.0$, here, R1 is the radius of curvature of the object-side surface of the first lens, and R2 is the radius of curvature of the image-side surface of the first lens. More specifically, R1 and R2 may further satisfy: $4.5 < |R1+R2|/|R1-R2| < 6.5$, for example, $4.56 \leq |R1+R2|/|R1-R2| \leq 6.30$. Satisfying the conditional expression $4.0 < |R1+R2|/|R1-R2| < 7.0$ is beneficial for correcting the astigmatism of the imaging system, improving the imaging quality, and improving the energy density of the light converged on the image plane.

In an exemplary implementation, the optical imaging system of the present disclosure may satisfy the conditional expression: $3.5<TTL/\Sigma AT<5.0$, here, TTL is the distance of the center of the object-side surface of the first lens to the image plane of the optical imaging system on the optical axis, and $\Sigma AT$ is the sum of spacing distances of any two adjacent lenses among the first lens to the fourth lens on the optical axis. More specifically, TTL and $\Sigma AT$ may further satisfy: $3.8<TTL/\Sigma AT<4.8$, for example, $3.97 \leq TTL/\Sigma AT \leq 4.74$. Satisfying the conditional expression $3.5<TTL/\Sigma AT<5.0$ is advantageous for balancing the thicknesses of the lenses and the air gap between the lenses; at the same time, it is advantageous for the processing and manufacturing of the imaging system.

It should be noted that in an imaging system having four lenses with refractive powers, $\Sigma AT$ is the sum of the spacing distances of any two adjacent lenses among the first lens to the fourth lens on the optical axis, that is, $\Sigma AT = T12 + T23 + T34$, here, T12 is the spacing distance of the first lens to the second lens on the optical axis, T23 is the spacing distance of the second lens to the third lens on the optical axis, and T34 is the spacing distance of the third lens to the fourth lens on the optical axis.

In an exemplary implementation, the optical imaging system of the present disclosure may satisfy the conditional expression: $1.0<|f/f3|+|f/f4|<4.0$, here, f is the total effective focal length of the optical imaging system, f3 is the effective focal length of the third lens, and f4 is the effective focal length of the fourth lens. More specifically, f, f3, and f4 may further satisfy: $1.5<|f/f3|+|f/f4|<3.9$, for example, $1.56 \leq |f/f3|+|f/f4| \leq 3.79$. Satisfying the conditional expression $1.0<|f/f3|+|f/f4|<4.0$ is beneficial for correcting aberrations of the imaging system and improving the imaging quality; at the same time, it is advantageous to shorten the total track length TTL of the imaging system and achieve miniaturization.

In an exemplary implementation, the optical imaging system of the present disclosure may include an infrared bandpass filter disposed between the fourth lens and the image plane, and the bandpass waveband of the infrared bandpass filter may be about 750 nm to about 1000 nm, and further, the bandpass waveband may be about 850 nm to about 940 nm. Providing an infrared bandpass filter between the fourth lens and the image plane enables infrared light to pass through and filters stray light to eliminate the signal interference caused by non-infrared light, for example, imaging blur due to chromatic aberrations introduced by the non-infrared light.

Alternatively, the optical imaging system may also include at least one diaphragm STO for improving the imaging quality of the imaging system. The diaphragm may be disposed at any position as needed, for example, the diaphragm may be disposed between the object side and the first lens.

Alternatively, the optical imaging system may further include a cover glass for protecting the photosensitive element on the image plane.

The optical imaging system according to the above implementations of the present disclosure may use a plurality of lenses, for example, four lenses as described above. By reasonably distributing the refractive power of each lens, the surface type of each lens, the center thickness of each lens, the spacing distances between the lenses on the axis, etc., the volume of the imaging system may be effectively reduced, the sensitivity of the imaging system may be reduced, and the processability of the imaging system may be improved, making the optical imaging system more conducive to production and processing and applicable to portable electronic products. At the same time, the optical imaging system with the above configurations also has beneficial effects such as large aperture, high imaging quality, low sensibility and imaging based on infrared bandwave.

In the implementations of the present disclosure, at least one of the surfaces of the each lens is an aspheric surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging system without departing from the technical solution claimed by the present disclosure. For example, although four lenses are described as an example in the implementations, the optical imaging system is not limited to include four lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1-2C. FIG. 1 is a schematic structural diagram illustrating an optical imaging system according to Embodiment 1 of the present disclosure.

As shown in FIG. 1, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 1 shows the surface type, the radius of curvature, the thickness, the material and the conic coefficient of each lens of the optical imaging system in Embodiment 1. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | 350.0000 | | | |
| STO | spherical | infinite | −0.2265 | | | |
| S1 | aspheric | 1.8202 | 0.5027 | 1.62 | 23.5 | −4.1127 |
| S2 | aspheric | 1.2580 | 0.0652 | | | −11.8588 |
| S3 | aspheric | 0.7703 | 0.3000 | 1.53 | 55.8 | −2.5649 |
| S4 | aspheric | 1.4097 | 0.7377 | | | −3.1628 |
| S5 | aspheric | 4.5553 | 0.3854 | 1.53 | 55.8 | −99.0000 |
| S6 | aspheric | 1.1328 | 0.2030 | | | −23.0135 |
| S7 | aspheric | 0.6865 | 0.7830 | 1.53 | 55.8 | −5.7441 |
| S8 | aspheric | 1.6207 | 0.4289 | | | −4.6515 |
| S9 | spherical | infinite | 0.2100 | 1.52 | 64.2 | |
| S10 | spherical | infinite | 0.3749 | | | |
| S11 | spherical | infinite | | | | |

As may be seen from Table 1, the object-side surface and the image-side surface of any one of the first lens E1 to the fourth lens E4 are aspheric surfaces. In the present embodiment, the surface type x of each aspheric lens may be defined by, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below gives the high-order coefficients $A_4, A_6, A_8, A_{10}, A_{12}, A_{14}$ and $A_{16}$ applicable to the aspheric surfaces S1-S8 in Embodiment 1.

TABLE 2

| surface number | A4 | A6 | A8 | A10 | A12 | A14 | A16 |
|---|---|---|---|---|---|---|---|
| S1 | 2.4716E−02 | 1.4688E−01 | −4.0340E−01 | 6.5619E−01 | −6.5254E−01 | 3.5834E−01 | −8.4156E−02 |
| S2 | −2.0396E−01 | 4.4580E−01 | −6.9799E−01 | 6.3247E−01 | −2.9404E−01 | 5.1644E−02 | −1.3137E−03 |
| S3 | −2.3513E−01 | 1.1028E+00 | −2.5894E+00 | 2.9545E+00 | −1.8175E+00 | 6.0456E−01 | −8.8824E−02 |
| S4 | 3.6434E−01 | −5.1474E−01 | 4.0162E−01 | −7.1192E−01 | 1.0568E+00 | −6.9864E−01 | 1.7158E−01 |
| S5 | −4.2141E−01 | 1.6411E+00 | −3.8440E+00 | 5.1901E+00 | −4.1578E+00 | 1.8028E+00 | −3.2695E−01 |
| S6 | −9.1307E−01 | 2.3379E+00 | −4.3716E+00 | 5.0748E+00 | −3.5032E+00 | 1.3000E+00 | −1.9670E−01 |
| S7 | 6.5101E−03 | −1.9361E−01 | 5.0134E−02 | 4.935 1E−02 | −3.1481E−02 | 6.7772E−03 | −5.1855E−04 |
| S8 | 5.6084E−02 | −2.2830E−01 | 1.6651E−01 | −7.1228E−02 | 1.9163E−02 | −2.9536E−03 | 1.9437E−04 |

Table 3 gives the effective focal lengths f1-f4 of the lenses in Embodiment 1, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 3

| f1 (mm) | −10.02 | f (mm) | 2.84 |
|---|---|---|---|
| f2 (mm) | 2.78 | TTL (mm) | 3.99 |

TABLE 3-continued

| f3 (mm) | −2.98 | ImgH (mm) | 2.36 |
|---|---|---|---|
| f4 (mm) | 1.76 | | |

The optical imaging system in Embodiment 1 satisfies at least one of the following conditions.

f/EPD=1.34, here, f is the total effective focal length of the optical imaging system, and EPD is the entrance pupil diameter of the optical imaging system.

TTL/EPD=1.88, here, TTL is the distance from the center of the object-side surface S1 of the first lens E1 to the image plane S11 on the optical axis, and EPD is the entrance pupil diameter of the optical imaging system.

CT4/CT1=1.56, here, CT1 is the center thickness of the first lens E1 on the optical axis, and CT4 is the center thickness of the fourth lens E4 on the optical axis.

f1/f=−3.53, here, f1 is the effective focal length of the first lens E1, and f is the total effective focal length of the optical imaging system.

f4/f2=0.63, here, f4 is the effective focal length of the fourth lens E4, and f2 is the effective focal length of the second lens E2.

f3/R5=−0.65, here, f3 is the effective focal length of the third lens E3, and R5 is the radius of curvature of the object-side surface S5 of the third lens E3.

(R7+R8)/(R7−R8)=−2.47, here, R7 is the radius of curvature of the object-side surface S7 of the fourth lens E4, and R8 is the radius of curvature of the image-side surface S8 of the fourth lens E4.

f2/CT2=9.26, here, f2 is the effective focal length of the second lens E2, and CT2 is the center thickness of the second lens E2 on the optical axis.

|R1+R2|/|R1−R2|=5.48, here, R1 is the radius of curvature of the object-side surface S1 of the first lens E1, and R2 is the radius of curvature of the image-side surface S2 of the first lens E1.

TTL/ΣAT=3.97, here, TTL is the distance from the center of the object-side surface S1 of the first lens E1 to the image plane S11 on the optical axis, and ΣAT is the sum of the spacing distances of any two adjacent lenses among the first lens E1 to the fourth lens E4 on the optical axis.

|f/f3|+|f/f4|=2.57, here, f is the total effective focal length of the optical imaging system, f3 is the effective focal length of the third lens E3, and f4 is the effective focal length of the fourth lens E4.

Figure 2A:
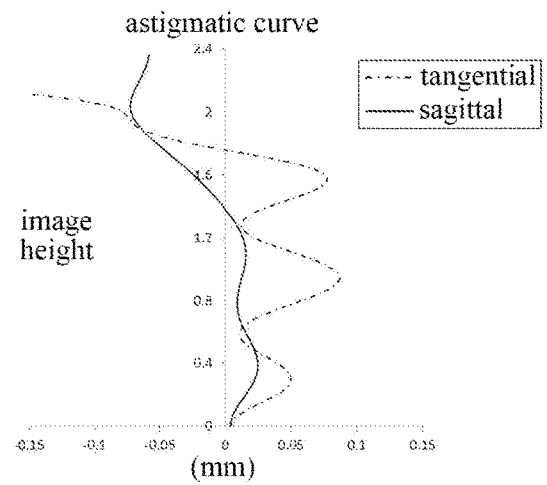
FIGS. 2A-2C respectively illustrate an astigmatic curve, a distortion curve and a lateral color curve of the optical imaging system according to Embodiment 1.
Figure 2B:
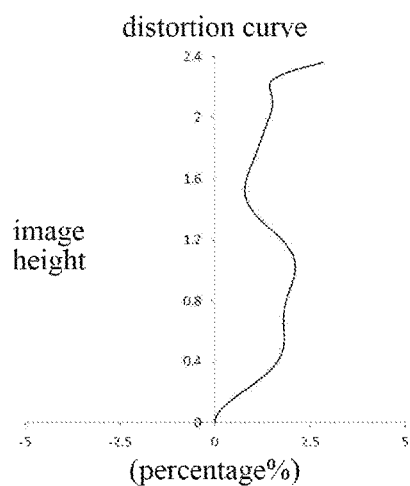
Figure 2C:
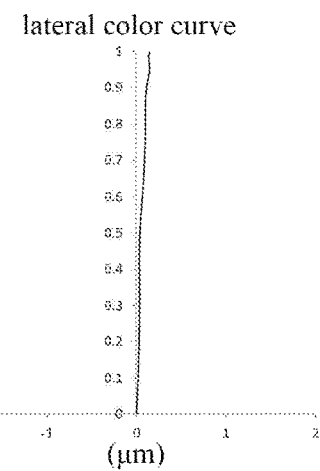

In addition, FIG. 2A illustrates the astigmatic curve of the optical imaging system according to Embodiment 1, representing a curvature of the tangential image plane and a curvature of the sagittal image plane. FIG. 2B illustrates the distortion curve of the optical imaging system according to Embodiment 1, representing amounts of distortion at different viewing angles. FIG. 2C illustrates the lateral color curve of the optical imaging system according to Embodiment 1, representing deviations of different image heights on the image plane after light passes through the system. It can be seen from FIGS. 2A-2C that the optical imaging system according to Embodiment 1 can achieve a good imaging quality.

Embodiment 2

Figure 3:
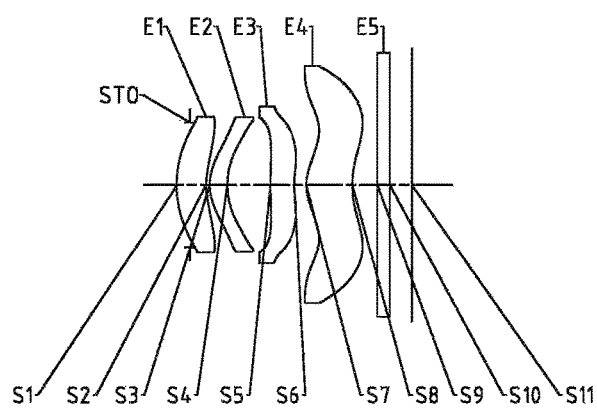
FIG. 3 is a schematic structural diagram illustrating an optical imaging system according to Embodiment 2 of the present disclosure.

An optical imaging system according to Embodiment 2 of the present disclosure is described below with reference to FIGS. 3-4C. In the present embodiment and the following embodiments, for the purpose of brevity, the description of parts similar to those in Embodiment 1 will be omitted. FIG. 3 is a schematic structural diagram illustrating the optical imaging system according to Embodiment 2 of the present disclosure.

As shown in FIG. 3, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 4 shows the surface type, the radius of curvature, the thickness, the material and the conic coefficient of each lens of the optical imaging system in Embodiment 2. The radius of curvature and the thickness are shown in millimeters (mm).

TABLE 4

| surface number | surface type | radius of curvature | thickness | material refractive index | abbe number | conic coefficient |
|---|---|---|---|---|---|---|
| OBJ | spherical | infinite | 350.0000 | | | |
| STO | spherical | infinite | −0.2278 | | | |
| S1 | aspheric | 1.8255 | 0.5006 | 1.62 | 23.5 | −4.2828 |
| S2 | aspheric | 1.2169 | 0.0602 | | | −12.2519 |
| S3 | aspheric | 0.8165 | 0.3000 | 1.53 | 55.8 | −2.5123 |
| S4 | aspheric | 1.4097 | 0.7284 | | | −3.2199 |
| S5 | aspheric | 5.0585 | 0.4117 | 1.53 | 55.8 | −98.9016 |
| S6 | aspheric | 1.2058 | 0.2043 | | | −26.9153 |
| S7 | aspheric | 0.6991 | 0.7789 | 1.53 | 55.8 | −5.9759 |
| S8 | aspheric | 1.6365 | 0.4250 | | | −2.8259 |
| S9 | spherical | infinite | 0.2100 | 1.52 | 64.2 | |
| S10 | spherical | infinite | 0.3710 | | | |
| S11 | spherical | infinite | | | | |

As may be seen from Table 4, in Embodiment 2, the object-side surface and the image-side surface of any one of the first lens E1 to the fourth lens E4 are aspheric surfaces. Table 5 shows the high-order coefficients of the aspheric surfaces applicable in Embodiment 2. Here, the surface types of the aspheric surfaces may be defined by the formula (1) given in the above Embodiment 1.

TABLE 5

| surface number | A4 | A6 | A8 | A10 | A12 | A14 | A16 |
|---|---|---|---|---|---|---|---|
| S1 | 3.6157E−02 | 9.0978E−02 | −2.1921E−01 | 3.3079E−01 | −3.3628E−01 | 1.9778E−01 | −5.0840E−02 |
| S2 | −1.1647E−01 | 7.1800E−02 | 1.1956E−01 | −4.2206E−01 | 4.9976E−01 | −2.6946E−01 | 5.2616E−02 |
| S3 | −2.0352E−01 | 9.4701E−01 | −2.1971E+00 | 2.4304E+00 | −1.4323E+00 | 4.5712E−01 | −6.5677E−02 |
| S4 | 3.3386E−01 | −3.4807E−01 | −3.2137E−02 | −4.7941E−02 | 4.7788E−01 | −4.3167E−01 | 1.2208E−01 |
| S5 | −4.2393E−01 | 1.6915E+00 | −4.1589E+00 | 5.9275E+00 | −5.0185E+00 | 2.3047E+00 | −4.4329E−01 |
| S6 | −8.8160E−01 | 2.2004E+00 | −4.1141E+00 | 4.8023E+00 | −3.3379E+00 | 1.2475E+00 | −1.9008E−01 |
| S7 | 6.9041E−03 | −2.1640E−01 | 8.2389E−02 | 2.9253E−02 | −2.5067E−02 | 5.7623E−03 | −4.5570E−04 |
| S8 | −1.1589E−02 | −1.6204E−01 | 1.2233E−01 | −5.2020E−02 | 1.4097E−02 | −2.2360E−03 | 1.5325E−04 |

Table 6 gives the effective focal lengths f1-f4 of the lenses in Embodiment 2, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 6

| f1 (mm) | −8.62 | f (mm) | 2.84 |
|---|---|---|---|
| f2 (mm) | 2.63 | TTL (mm) | 3.99 |
| f3 (mm) | −3.12 | ImgH (mm) | 2.36 |
| f4 (mm) | 1.80 | | |

Figure 4A:
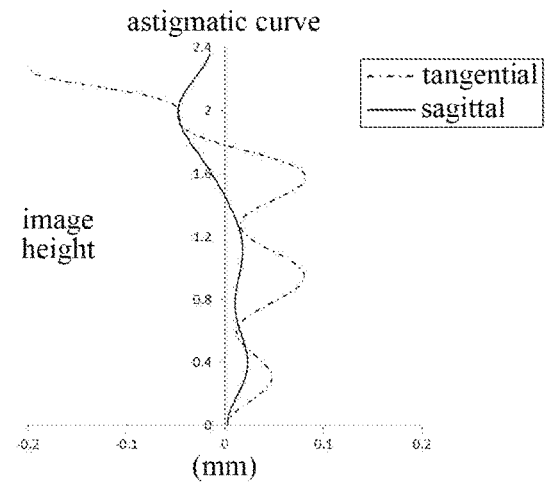
FIGS. 4A-4C respectively illustrate an astigmatic curve, a distortion curve and a lateral color curve of the optical imaging system according to Embodiment 2.
Figure 4B:
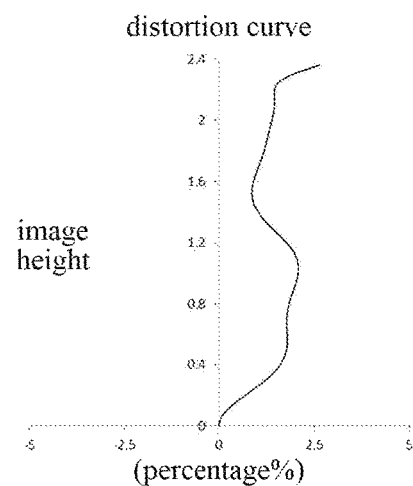
Figure 4C:
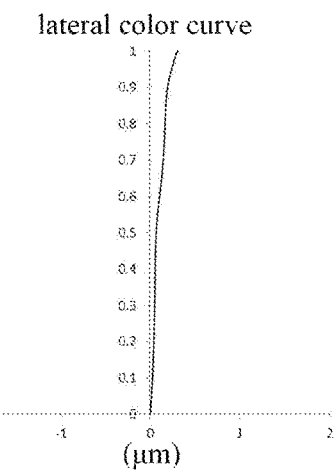

FIG. 4A illustrates the astigmatic curve of the optical imaging system according to Embodiment 2, representing a curvature of the tangential image plane and a curvature of the sagittal image plane. FIG. 4B illustrates the distortion curve of the optical imaging system according to Embodiment 2, representing amounts of distortion at different viewing angles. FIG. 4C illustrates the lateral color curve of the optical imaging system according to Embodiment 2, representing deviations of different image heights on the image plane after light passes through the system. It can be seen from FIGS. 4A-4C that the optical imaging system according to Embodiment 2 can achieve a good imaging quality.

Embodiment 3

Figure 5:
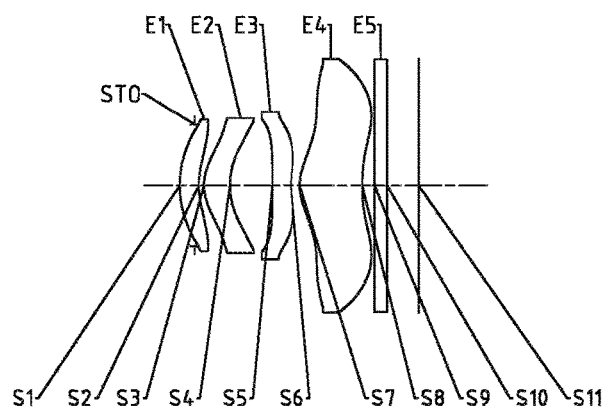
FIG. 5 is a schematic structural diagram illustrating an optical imaging system according to Embodiment 3 of the present disclosure.

An optical imaging system according to Embodiment 3 of the present disclosure is described below with reference to FIGS. 5-6C. FIG. 5 is a schematic structural diagram illustrating the optical imaging system according to Embodiment 3 of the present disclosure.

As shown in FIG. 5, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 7 shows the surface type, the radius of curvature, the thickness, the material and the conic coefficient of each lens of the optical imaging system in Embodiment 3. The radius of curvature and the thickness are shown in millimeters (mm).

TABLE 7

| | | | | material | | |
|---|---|---|---|---|---|---|
| surface number | surface type | radius of curvature | thickness | refractive index | abbe number | conic coefficient |
| OBJ | spherical | infinite | 350.0000 | | | |
| STO | spherical | infinite | −0.2500 | | | |
| S1 | aspheric | 1.6683 | 0.3181 | 1.62 | 23.5 | −4.9016 |
| S2 | aspheric | 1.1403 | 0.0875 | | | −10.2466 |
| S3 | aspheric | 0.7508 | 0.4341 | 1.53 | 55.8 | −2.6754 |
| S4 | aspheric | 1.3282 | 0.7086 | | | −4.4750 |
| S5 | aspheric | 13.0754 | 0.3158 | 1.53 | 55.8 | −99.0000 |
| S6 | aspheric | 1.2308 | 0.1495 | | | −21.1229 |
| S7 | aspheric | 0.7426 | 1.0443 | 1.53 | 55.8 | −5.8176 |
| S8 | aspheric | 3.0545 | 0.2054 | | | −67.1605 |
| S9 | spherical | infinite | 0.2100 | 1.52 | 64.2 | |
| S10 | spherical | infinite | 0.5268 | | | |
| S11 | spherical | infinite | | | | |

As may be seen from Table 7, in Embodiment 3, the object-side surface and the image-side surface of any one of the first lens E1 to the fourth lens E4 are aspheric surfaces. Table 8 shows the high-order coefficients of the aspheric surfaces applicable in Embodiment 3. Here, the surface types of the aspheric surfaces may be defined by the formula (1) given in the above Embodiment 1.

TABLE 8

| surface number | A4 | A6 | A8 | A10 | A12 | A14 | A16 |
|---|---|---|---|---|---|---|---|
| S1 | 3.7856E−02 | 1.5889E−01 | −4.0539E−01 | 6.5142E−01 | −6.5584E−01 | 3.6060E−01 | −8.4850E−02 |
| S2 | −1.9064E−01 | 4.3132E−01 | −6.9877E−01 | 6.3136E−01 | −2.9098E−01 | 4.8284E−02 | 4.3084E−04 |
| S3 | −2.6322E−01 | 1.1025E+00 | −2.5797E+00 | 2.9548E+00 | −1.8325E+00 | 5.9999E−01 | −7.9270E−02 |
| S4 | 3.6660E−01 | −5.0154E−01 | 3.9572E−01 | −7.0166E−01 | 1.0430E+00 | −7.0451E−01 | 1.7608E−01 |
| S5 | −4.7055E−01 | 1.6561E+00 | −3.8323E+00 | 5.1929E+00 | −4.1499E+00 | 1.8000E+00 | −3.2979E−01 |
| S6 | −9.5394E−01 | 2.3517E+00 | −4.3614E+00 | 5.0794E+00 | −3.5016E+00 | 1.3005E+00 | −1.9702E−01 |
| S7 | −9.1677E−03 | −1.2698E−01 | 9.6855E−02 | −3.0549E−02 | 4.7226E−03 | −3.3517E−04 | 7.8419E−06 |
| S8 | 2.9397E−01 | −4.4821E−01 | 3.1171E−01 | −1.2933E−01 | 3.1803E−02 | −4.2406E−03 | 2.3491E−04 |

Table 9 gives the effective focal lengths f1-f4 of the lenses in Embodiment 3, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 9

| f1 (mm) | −7.59 | f (mm) | 2.84 |
|---|---|---|---|
| f2 (mm) | 2.61 | TTL (mm) | 4.00 |
| f3 (mm) | −2.61 | ImgH (mm) | 2.12 |
| f4 (mm) | 1.62 | | |

Figure 6A:
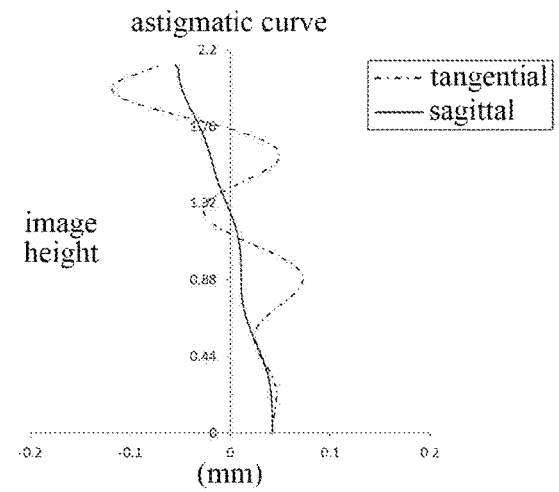
FIGS. 6A-6C respectively illustrate an astigmatic curve, a distortion curve and a lateral color curve of the optical imaging system according to Embodiment 3.
Figure 6B:
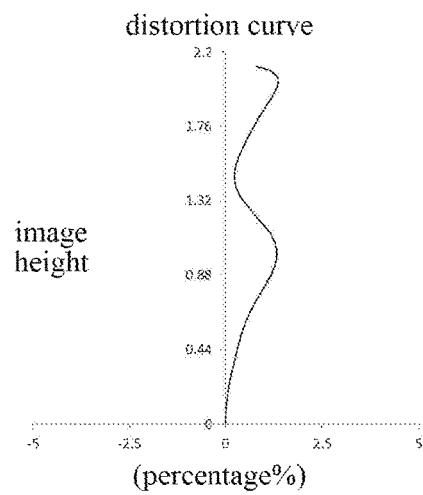
Figure 6C:
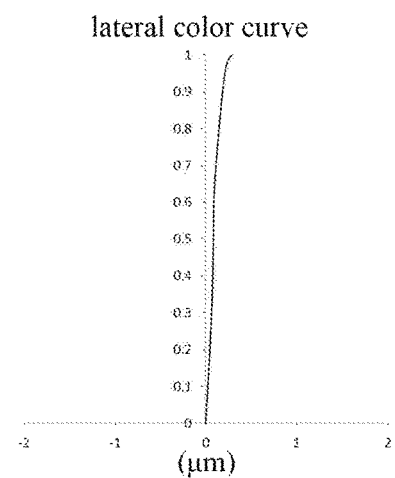

FIG. 6A illustrates the astigmatic curve of the optical imaging system according to Embodiment 3, representing a curvature of the tangential image plane and a curvature of the sagittal image plane. FIG. 6B illustrates the distortion curve of the optical imaging system according to Embodiment 3, representing amounts of distortion at different viewing angles. FIG. 6C illustrates the lateral color curve of the optical imaging system according to Embodiment 3, representing deviations of different image heights on the image plane after light passes through the system. It can be seen from FIGS. 6A-6C that the optical imaging system according to Embodiment 3 can achieve a good imaging quality.

Embodiment 4

Figure 7:
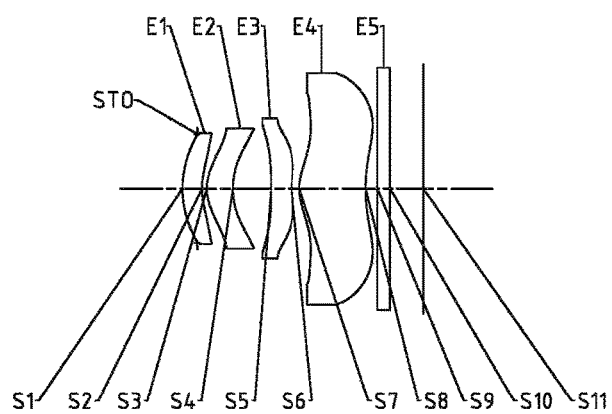
FIG. 7 is a schematic structural diagram illustrating an optical imaging system according to Embodiment 4 of the present disclosure.

An optical imaging system according to Embodiment 4 of the present disclosure is described below with reference to FIGS. 7-8C. FIG. 7 is a schematic structural diagram illustrating the optical imaging system according to Embodiment 4 of the present disclosure.

As shown in FIG. 7, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 10 shows the surface type, the radius of curvature, the thickness, the material and the conic coefficient of each lens of the optical imaging system in Embodiment 4. The radius of curvature and the thickness are shown in millimeters (mm).

TABLE 10

| | | | | material | | |
|---|---|---|---|---|---|---|
| surface number | surface type | radius of curvature | thickness | refractive index | abbe number | conic coefficient |
| OBJ | spherical | infinite | 350.0000 | | | |
| STO | spherical | infinite | −0.2500 | | | |
| S1 | aspheric | 1.6084 | 0.3224 | 1.62 | 23.5 | −5.9792 |
| S2 | aspheric | 1.0650 | 0.0807 | | | −10.3637 |
| S3 | aspheric | 0.7291 | 0.4325 | 1.53 | 55.8 | −3.0094 |
| S4 | aspheric | 1.3465 | 0.6340 | | | −3.3591 |
| S5 | aspheric | −15.1732 | 0.3427 | 1.53 | 55.8 | −99.0000 |
| S6 | aspheric | 1.3865 | 0.1296 | | | −50.1724 |
| S7 | aspheric | 0.7259 | 1.1003 | 1.53 | 55.8 | −7.8387 |
| S8 | aspheric | 3.0589 | 0.1951 | | | −14.2896 |
| S9 | spherical | infinite | 0.2100 | 1.52 | 64.2 | |
| S10 | spherical | infinite | 0.5526 | | | |
| S11 | spherical | infinite | | | | |

As may be seen from Table 10, in Embodiment 4, the object-side surface and the image-side surface of any one of the first lens E1 to the fourth lens E4 are aspheric surfaces. Table 11 shows the high-order coefficients of the aspheric surfaces applicable in Embodiment 4. Here, the surface types of the aspheric surfaces may be defined by the formula (1) given in the above Embodiment 1.

TABLE 11

| surface number | A4 | A6 | A8 | A10 | A12 | A14 | A16 |
|---|---|---|---|---|---|---|---|
| S1 | 5.7656E−02 | 1.5492E−01 | −4.0843E−01 | 6.6156E−01 | −6.5882E−01 | 3.5846E−01 | −8.2564E−02 |
| S2 | −2.1118E−01 | 4.6538E−01 | −7.0407E−01 | 6.2204E−01 | −2.9083E−01 | 5.4097E−02 | −1.0185E−03 |
| S3 | −2.5016E−01 | 1.0871E+00 | −2.5703E+00 | 2.9420E+00 | −1.8363E+00 | 6.0013E−01 | −7.5577E−02 |
| S4 | 3.3201E−01 | −5.0064E−01 | 4.5997E−01 | −7.5772E−01 | 1.0476E+00 | −7.0874E−01 | 1.8106E−01 |
| S5 | −4.1099E−01 | 1.5485E+00 | −3.8067E+00 | 5.2501E+00 | −4.1148E+00 | 1.8013E+00 | −3.6118E−01 |
| S6 | −1.0543E+00 | 2.4389E+00 | −4.3901E+00 | 5.0355E+00 | −3.4278E+00 | 1.3028E+00 | −2.1300E−01 |
| S7 | −4.8643E−02 | −1.9640E−01 | 2.4119E−01 | −1.2941E−01 | 3.8928E−02 | −6.5604E−03 | 4.7510E−04 |
| S8 | 1.1913E−01 | −2.3973E−01 | 1.4747E−01 | −4.6378E−02 | 6.3258E−03 | 7.1637E−05 | −7.6071E−05 |

Table 12 gives the effective focal lengths f1-f4 of the lenses in Embodiment 4, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 12

| f1 (mm) | −6.61 | f (mm) | 2.84 |
|---|---|---|---|
| f2 (mm) | 2.44 | TTL (mm) | 4.00 |
| f3 (mm) | −2.40 | ImgH (mm) | 2.08 |
| f4 (mm) | 1.56 | | |

Figure 8A:
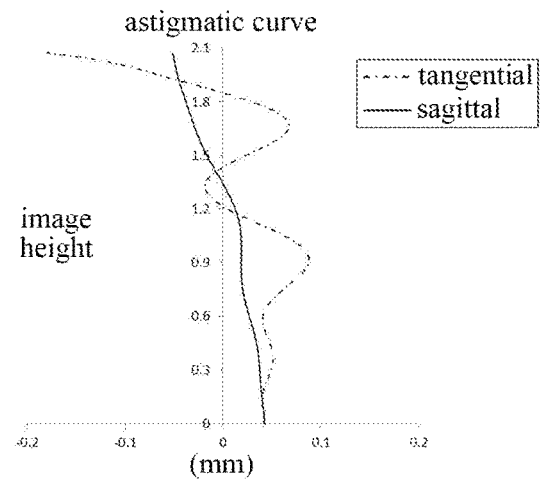
FIGS. 8A-8C respectively illustrate an astigmatic curve, a distortion curve and a lateral color curve of the optical imaging system according to Embodiment 4.
Figure 8B:
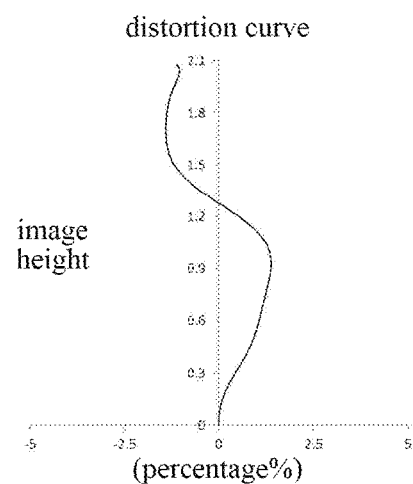
Figure 8C:
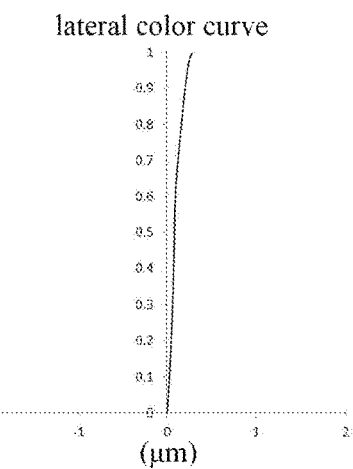

FIG. 8A illustrates the astigmatic curve of the optical imaging system according to Embodiment 4, representing a curvature of the tangential image plane and a curvature of the sagittal image plane. FIG. 8B illustrates the distortion curve of the optical imaging system according to Embodiment 4, representing amounts of distortion at different viewing angles. FIG. 8C illustrates the lateral color curve of the optical imaging system according to Embodiment 4, representing deviations of different image heights on the image plane after light passes through the system. It can be seen from FIGS. 8A-8C that the optical imaging system according to Embodiment 4 can achieve a good imaging quality.

Embodiment 5

Figure 9:
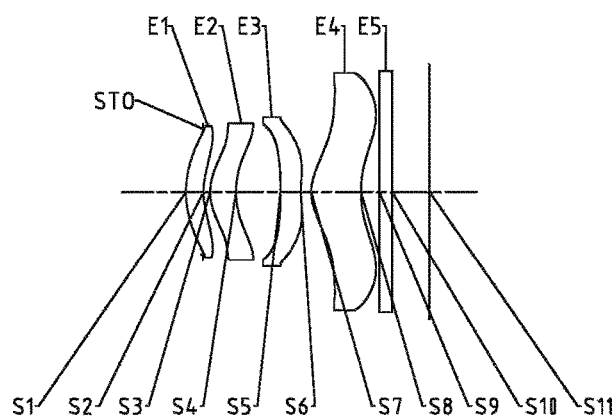
FIG. 9 is a schematic structural diagram illustrating an optical imaging system according to Embodiment 5 of the present disclosure.

An optical imaging system according to Embodiment 5 of the present disclosure is described below with reference to FIGS. 9-10C. FIG. 9 is a schematic structural diagram illustrating the optical imaging system according to Embodiment 5 of the present disclosure.

As shown in FIG. 9, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a concave surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 13 shows the surface type, the radius of curvature, the thickness, the material and the conic coefficient of each lens of the optical imaging system in Embodiment 5. The radius of curvature and the thickness are shown in millimeters (mm).

TABLE 13

| | | | | material | | |
|---|---|---|---|---|---|---|
| surface number | surface type | radius of curvature | thickness | refractive index | abbe number | conic coefficient |
| OBJ | spherical | infinite | 350.0000 | | | |
| STO | spherical | infinite | −0.2800 | | | |
| S1 | aspheric | 1.5026 | 0.2871 | 1.62 | 23.5 | −8.1910 |
| S2 | aspheric | 1.0420 | 0.1092 | | | −8.6836 |
| S3 | aspheric | 0.7877 | 0.4239 | 1.53 | 55.8 | −1.5553 |
| S4 | aspheric | 1.4859 | 0.7277 | | | −4.0731 |
| S5 | aspheric | −33.1440 | 0.3435 | 1.53 | 55.8 | −99.0000 |
| S6 | aspheric | 1.3931 | 0.1703 | | | −49.0952 |
| S7 | aspheric | 0.6651 | 0.8166 | 1.53 | 55.8 | −5.2900 |
| S8 | aspheric | 1.9542 | 0.3012 | | | −0.2187 |
| S9 | spherical | infinite | 0.2100 | 1.52 | 64.2 | |
| S10 | spherical | infinite | 0.6106 | | | |
| S11 | spherical | infinite | | | | |

As may be seen from Table 13, in Embodiment 5, the object-side surface and the image-side surface of any one of the first lens E1 to the fourth lens E4 are aspheric surfaces. Table 14 shows the high-order coefficients of the aspheric surfaces applicable in Embodiment 5. Here, the surface types of the aspheric surfaces may be defined by the formula (1) given in the above Embodiment 1.

TABLE 14

| surface number | A4 | A6 | A8 | A10 | A12 | A14 | A16 |
|---|---|---|---|---|---|---|---|
| S1 | 5.9683E−02 | 1.7068E−01 | −4.2346E−01 | 5.9615E−01 | −6.0392E−01 | 3.7450E−01 | −1.0831E−01 |
| S2 | −2.1376E−01 | 4.4803E−01 | −7.3368E−01 | 6.4665E−01 | −2.9347E−01 | 4.5643E−02 | −2.8687E−04 |
| S3 | −5.4299E−01 | 1.3536E+00 | −2.7445E+00 | 2.9803E+00 | −1.8110E+00 | 6.0041E−01 | −8.2037E−02 |
| S4 | 2.7617E−01 | −4.4873E−01 | 3.9098E−01 | −7.4120E−01 | 1.0577E+00 | −6.8768E−01 | 1.6152E−01 |
| S5 | −5.0225E−01 | 1.7339E+00 | −3.9157E+00 | 5.1997E+00 | −4.1865E+00 | 1.8853E+00 | −3.6852E−01 |
| S6 | −1.0429E+00 | 2.4458E+00 | −4.3410E+00 | 4.9848E+00 | −3.4907E+00 | 1.3379E+00 | −2.0980E−01 |
| S7 | 5.3609E−02 | −1.7358E−01 | 1.1919E−01 | −4.2196E−02 | 9.0643E−03 | −1.1555E−03 | 6.2896E−05 |
| S8 | 8.0191E−02 | −2.7357E−01 | 2.0542E−01 | −9.0242E−02 | 2.3192E−02 | −3.1556E−03 | 1.6999E−04 |

Table 15 gives the effective focal lengths f1-f4 of the lenses in Embodiment 5, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 15

| f1 (mm) | −7.24 | f (mm) | 2.84 |
|---|---|---|---|
| f2 (mm) | 2.64 | TTL (mm) | 4.00 |
| f3 (mm) | −2.54 | ImgH (mm) | 2.07 |
| f4 (mm) | 1.58 | | |

Figure 10A:
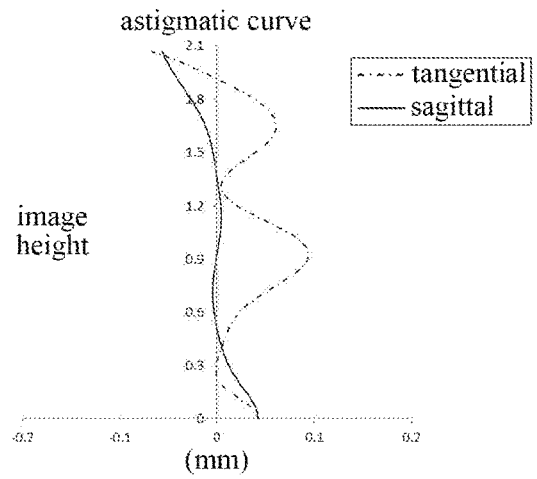
FIGS. 10A-10C respectively illustrate an astigmatic curve, a distortion curve and a lateral color curve of the optical imaging system according to Embodiment 5.
Figure 10B:
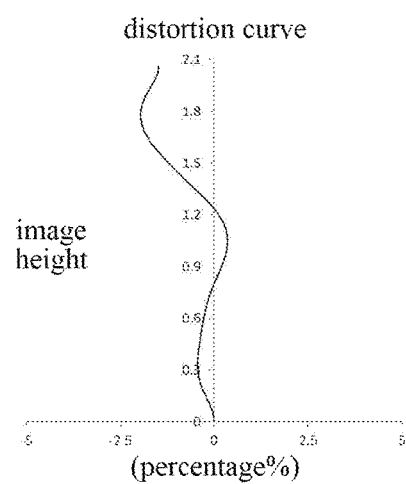
Figure 10C:
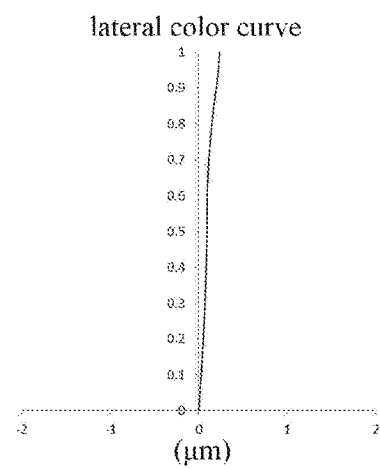

FIG. 10A illustrates the astigmatic curve of the optical imaging system according to Embodiment 5, representing a curvature of the tangential image plane and a curvature of the sagittal image plane. FIG. 10B illustrates the distortion curve of the optical imaging system according to Embodiment 5, representing amounts of distortion at different viewing angles. FIG. 10C illustrates the lateral color curve of the optical imaging system according to Embodiment 5, representing deviations of different image heights on the image plane after light passes through the system. It can be seen from FIGS. 10A-10C that the optical imaging system according to Embodiment 5 can achieve a good imaging quality.

Embodiment 6

Figure 11:
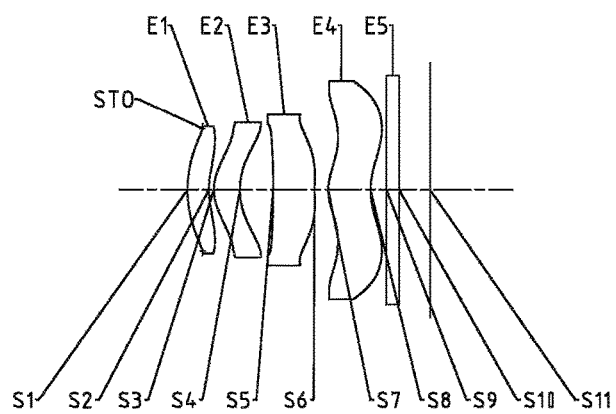
FIG. 11 is a schematic structural diagram illustrating an optical imaging system according to Embodiment 6 of the present disclosure.

An optical imaging system according to Embodiment 6 of the present disclosure is described below with reference to FIGS. 11-12C. FIG. 11 is a schematic structural diagram illustrating the optical imaging system according to Embodiment 6 of the present disclosure.

As shown in FIG. 11, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 16 shows the surface type, the radius of curvature, the thickness, the material and the conic coefficient of each lens of the optical imaging system in Embodiment 6. The radius of curvature and the thickness are shown in millimeters (mm).

TABLE 16

| | | | | material | | |
|---|---|---|---|---|---|---|
| surface number | surface type | radius of curvature | thickness | refractive index | abbe number | conic coefficient |
| OBJ | spherical | infinite | 350.0000 | | | |
| STO | spherical | infinite | −0.2500 | | | |
| S1 | aspheric | 1.8560 | 0.3521 | 1.62 | 23.5 | −5.0974 |
| S2 | aspheric | 1.1889 | 0.0825 | | | −14.0282 |
| S3 | aspheric | 0.7246 | 0.4287 | 1.53 | 55.8 | −2.8103 |
| S4 | aspheric | 1.2959 | 0.5456 | | | −3.4415 |
| S5 | aspheric | 46.8029 | 0.6934 | 1.53 | 55.8 | −99.0000 |
| S6 | aspheric | 2.9571 | 0.2246 | | | −321.0007 |
| S7 | aspheric | 0.7666 | 0.6950 | 1.53 | 55.8 | −7.0897 |
| S8 | aspheric | 1.1956 | 0.2603 | | | −2.1741 |
| S9 | spherical | infinite | 0.2100 | 1.52 | 64.2 | |
| S10 | spherical | infinite | 0.5078 | | | |
| S11 | spherical | infinite | | | | |

As may be seen from Table 16, in Embodiment 6, the object-side surface and the image-side surface of any one of the first lens E1 to the fourth lens E4 are aspheric surfaces. Table 17 shows the high-order coefficients of the aspheric surfaces applicable in Embodiment 6. Here, the surface types of the aspheric surfaces may be defined by the formula (1) given in the above Embodiment 1.

TABLE 17

| surface number | A4 | A6 | A8 | A10 | A12 | A14 | A16 |
|---|---|---|---|---|---|---|---|
| S1 | 1.0313E−02 | 1.6838E−01 | −4.2457E−01 | 6.4700E−01 | −6.5103E−01 | 3.6131E−01 | −8.8316E−02 |
| S2 | −2.2983E−01 | 4.3024E−01 | −7.0205E−01 | 6.6227E−01 | −3.2437E−01 | 3.8316E−02 | 1.4125E−02 |
| S3 | −2.7682E−01 | 1.0839E+00 | −2.5680E+00 | 2.9383E+00 | −1.8225E+00 | 6.0063E−01 | −7.8394E−02 |
| S4 | 3.6883E−01 | −6.1985E−01 | 5.3697E−01 | −7.4581E−01 | 1.0182E+00 | −7.1883E−01 | 1.8954E−01 |
| S5 | −3.9120E−01 | 1.6190E+00 | −3.7969E+00 | 5.2135E+00 | −4.1476E+00 | 1.7926E+00 | −3.4092E−01 |
| S6 | −1.0260E+00 | 2.5039E+00 | −4.3996E+00 | 5.0747E+00 | −3.5019E+00 | 1.3085E+00 | −2.0210E−01 |
| S7 | −7.3768E−02 | −3.6109E−01 | 5.5010E−01 | −3.7153E−01 | 1.3367E−01 | −2.4624E−02 | 1.8246E−03 |
| S8 | −1.8102E−01 | −6.5101E−02 | 1.3936E−01 | −8.7767E−02 | 2.8504E−02 | −4.9132E−03 | 3.5878E−04 |

Table 18 gives the effective focal lengths f1-f4 of the lenses in Embodiment 6, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 18

| f1 (mm) | −6.72 | f (mm) | 2.84 |
|---|---|---|---|
| f2 (mm) | 2.49 | TTL (mm) | 4.00 |
| f3 (mm) | −6.04 | ImgH (mm) | 2.11 |
| f4 (mm) | 2.61 | | |

Figure 12A:
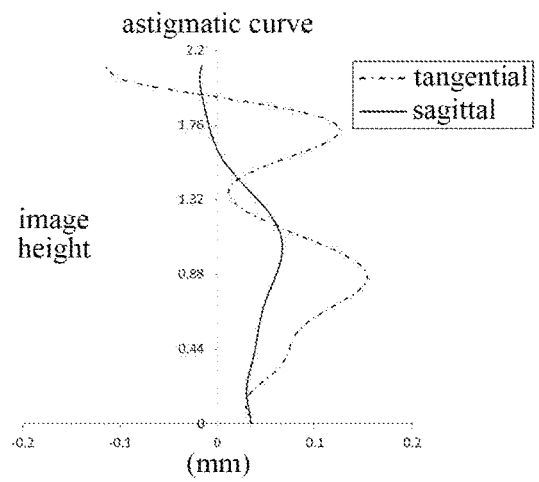
FIGS. 12A-12C respectively illustrate an astigmatic curve, a distortion curve and a lateral color curve of the optical imaging system according to Embodiment 6.
Figure 12B:
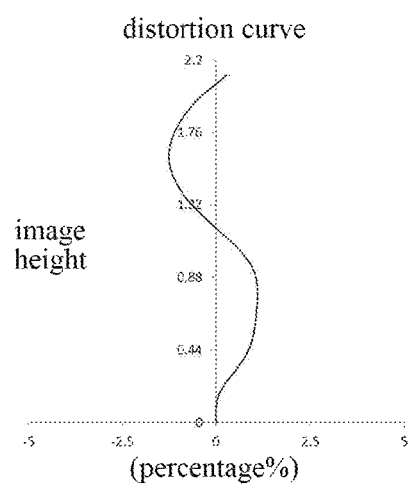
Figure 12C:
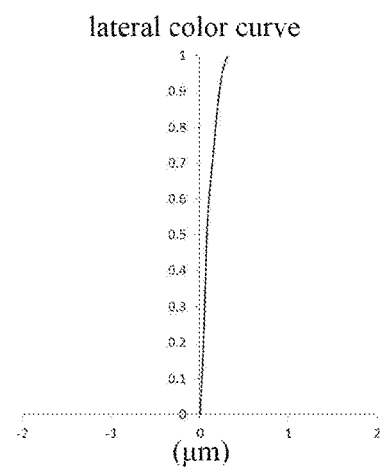

FIG. 12A illustrates the astigmatic curve of the optical imaging system according to Embodiment 6, representing a curvature of the tangential image plane and a curvature of the sagittal image plane. FIG. 12B illustrates the distortion curve of the optical imaging system according to Embodiment 6, representing amounts of distortion at different viewing angles. FIG. 12C illustrates the lateral color curve of the optical imaging system according to Embodiment 6, representing deviations of different image heights on the image plane after light passes through the system. It can be seen from FIGS. 12A-12C that the optical imaging system according to Embodiment 6 can achieve a good imaging quality.

Embodiment 7

Figure 13:
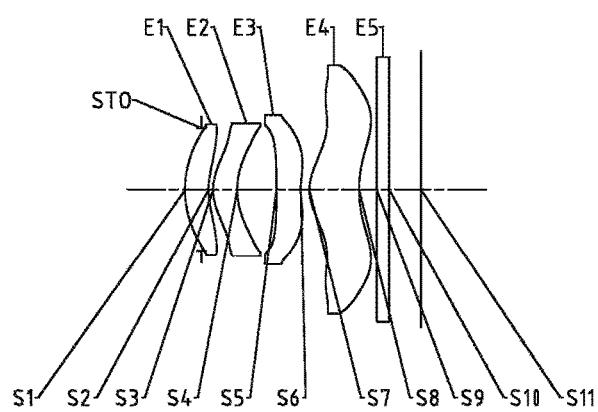
FIG. 13 is a schematic structural diagram illustrating an optical imaging system according to Embodiment 7 of the present disclosure.

An optical imaging system according to Embodiment 7 of the present disclosure is described below with reference to FIGS. 13-14C. FIG. 13 is a schematic structural diagram illustrating the optical imaging system according to Embodiment 7 of the present disclosure.

As shown in FIG. 13, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 19 shows the surface type, the radius of curvature, the thickness, the material and the conic coefficient of each lens of the optical imaging system in Embodiment 7. The radius of curvature and the thickness are shown in millimeters (mm).

TABLE 19

| surface number | surface type | radius of curvature | thickness | refractive index | abbe number | conic coefficient |
|---|---|---|---|---|---|---|
| OBJ | spherical | infinite | 350.0000 | | | |
| STO | spherical | infinite | −0.2800 | | | |
| S1 | aspheric | 1.7025 | 0.3984 | 1.62 | 23.5 | −1.9721 |
| S2 | aspheric | 1.2358 | 0.0755 | | | −10.6088 |
| S3 | aspheric | 0.7990 | 0.4101 | 1.53 | 55.8 | −2.8231 |
| S4 | aspheric | 1.3507 | 0.6605 | | | −5.4525 |
| S5 | aspheric | 18.6909 | 0.4209 | 1.53 | 55.8 | −99.0000 |
| S6 | aspheric | 1.0865 | 0.1467 | | | −27.7717 |
| S7 | aspheric | 0.6339 | 0.8426 | 1.53 | 55.8 | −5.4787 |
| S8 | aspheric | 2.2512 | 0.2975 | | | −0.8455 |
| S9 | spherical | infinite | 0.2100 | 1.52 | 64.2 | |
| S10 | spherical | infinite | 0.5378 | | | |
| S11 | spherical | infinite | | | | |

As may be seen from Table 19, in Embodiment 7, the object-side surface and the image-side surface of any one of the first lens E1 to the fourth lens E4 are aspheric surfaces. Table 20 shows the high-order coefficients of the aspheric surfaces applicable in Embodiment 7. Here, the surface types of the aspheric surfaces may be defined by the formula (1) given in the above Embodiment 1.

TABLE 20

| surface number | A4 | A6 | A8 | A10 | A12 | A14 | A16 |
|---|---|---|---|---|---|---|---|
| S1 | −1.6446E−03 | 1.6399E−01 | −4.0003E−01 | 6.5442E−01 | −6.6094E−01 | 3.5374E−01 | −7.8527E−02 |
| S2 | −1.9206E−01 | 4.3607E−01 | −7.3724E−01 | 6.5316E−01 | −2.9339E−01 | 5.7066E−02 | −3.8172E−03 |
| S3 | −2.8608E−01 | 1.0255E+00 | −2.5405E+00 | 2.9818E+00 | −1.8353E+00 | 6.0909E−01 | −8.9349E−02 |
| S4 | 3.8470E−01 | −6.4442E−01 | 6.1113E−01 | −8.0177E−01 | 1.0329E+00 | −6.7308E−01 | 1.7068E−01 |
| S5 | −4.4987E−01 | 1.6650E+00 | −3.8802E+00 | 5.2092E+00 | −4.1578E+00 | 1.7964E+00 | −3.2306E−01 |
| S6 | −9.6585E−01 | 2.3516E+00 | −4.3458E+00 | 5.0577E+00 | −3.5021E+00 | 1.2989E+00 | −1.9481E−01 |
| S7 | 5.3331E−02 | −1.9085E−01 | 8.7630E−02 | −3.0109E−03 | −6.8361E−03 | 1.7105E−03 | −1.2985E−04 |
| S8 | 1.3493E−01 | −3.3327E−01 | 2.4116E−01 | −1.0232E−01 | 2.5822E−02 | −3.5038E−03 | 1.9433E−04 |

Table 21 gives the effective focal lengths f1-f4 of the lenses in Embodiment 7, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 21

| f1 (mm) | −10.85 | f (mm) | 2.84 |
|---|---|---|---|
| f2 (mm) | 2.96 | TTL (mm) | 4.00 |
| f3 (mm) | −2.21 | ImgH (mm) | 2.12 |
| f4 (mm) | 1.42 | | |

Figure 14A:
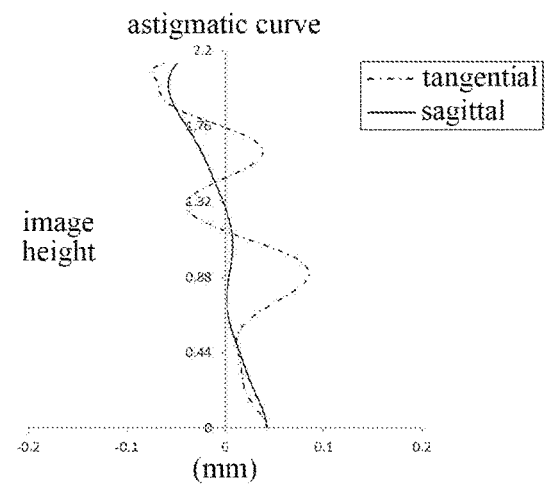
FIGS. 14A-14C respectively illustrate an astigmatic curve, a distortion curve and a lateral color curve of the optical imaging system according to Embodiment 7.
Figure 14B:
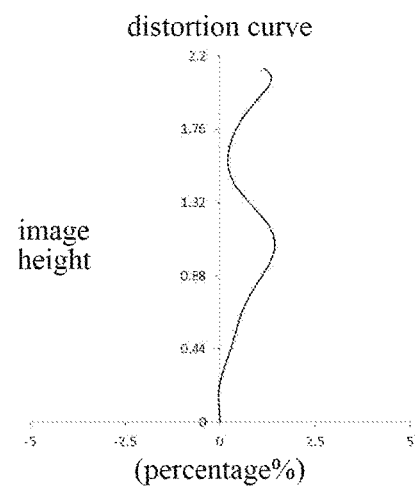
Figure 14C:
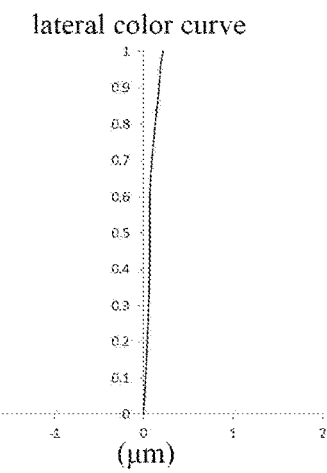

FIG. 14A illustrates the astigmatic curve of the optical imaging system according to Embodiment 7, representing a curvature of the tangential image plane and a curvature of the sagittal image plane. FIG. 14B illustrates the distortion curve of the optical imaging system according to Embodiment 7, representing amounts of distortion at different viewing angles. FIG. 14C illustrates the lateral color curve of the optical imaging system according to Embodiment 7, representing deviations of different image heights on the image plane after light passes through the system. It can be seen from FIGS. 14A-14C that the optical imaging system according to Embodiment 7 can achieve a good imaging quality.

Embodiment 8

Figure 15:
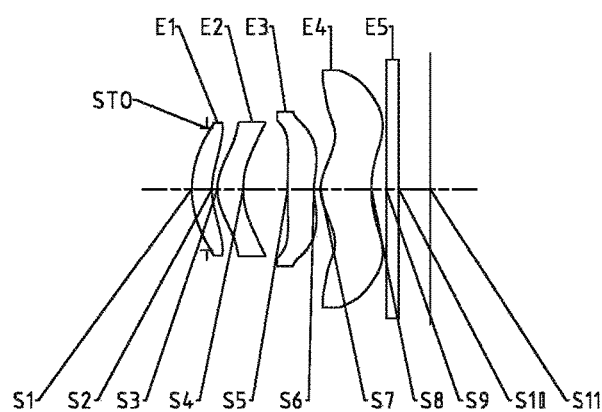
FIG. 15 is a schematic structural diagram illustrating an optical imaging system according to Embodiment 8 of the present disclosure.

An optical imaging system according to Embodiment 8 of the present disclosure is described below with reference to FIGS. 15-16C. FIG. 15 is a schematic structural diagram illustrating the optical imaging system according to Embodiment 8 of the present disclosure.

As shown in FIG. 15, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 22 shows the surface type, the radius of curvature, the thickness, the material and the conic coefficient of each lens of the optical imaging system in Embodiment 8. The radius of curvature and the thickness are shown in millimeters (mm).

TABLE 22

| | | | | material | | |
|---|---|---|---|---|---|---|
| surface number | surface type | radius of curvature | thickness | refractive index | abbe number | conic coefficient |
| OBJ | spherical | infinite | 350.0000 | | | |
| STO | spherical | infinite | −0.2500 | | | |
| S1 | aspheric | 1.5287 | 0.3351 | 1.62 | 23.5 | |
| S2 | aspheric | 1.0106 | 0.0927 | | | −7.6601 |
| S3 | aspheric | 0.7572 | 0.4334 | 1.53 | 55.8 | −2.4962 |
| S4 | aspheric | 1.5023 | 0.7421 | | | −5.3076 |
| S5 | aspheric | 6.7945 | 0.4493 | 1.53 | 55.8 | −99.0000 |
| S6 | aspheric | 0.8373 | 0.1118 | | | −16.2749 |
| S7 | aspheric | 0.5687 | 0.8508 | 1.53 | 55.8 | −4.8299 |
| S8 | aspheric | 2.0009 | 0.2492 | | | −3.5169 |
| S9 | spherical | infinite | 0.2100 | 1.52 | 64.2 | 0.0000 |
| S10 | spherical | infinite | 0.5256 | | | 0.0000 |
| S11 | spherical | infinite | | | | |

As may be seen from Table 22, in Embodiment 8, the object-side surface and the image-side surface of any one of the first lens E1 to the fourth lens E4 are aspheric surfaces. Table 23 shows the high-order coefficients of the aspheric surfaces applicable in Embodiment 8. Here, the surface types of the aspheric surfaces may be defined by the formula (1) given in the above Embodiment 1.

TABLE 23

| surface number | A4 | A6 | A8 | A10 | A12 | A14 | A16 |
|---|---|---|---|---|---|---|---|
| S1 | 6.0897E−02 | 1.4499E−01 | −4.1296E−01 | 6.6038E−01 | −6.5738E−01 | 3.6976E−01 | −9.2145E−02 |
| S2 | −2.0263E−01 | 4.2317E−01 | −7.1435E−01 | 6.9495E−01 | −3.5532E−01 | 7.7603E−02 | −6.2613E−03 |
| S3 | −3.0243E−01 | 1.0983E+00 | −2.5495E+00 | 2.9409E+00 | −1.8403E+00 | 6.0955E−01 | −8.2123E−02 |
| S4 | 3.5151E−01 | −5.0563E−01 | 4.0194E−01 | −6.6469E−01 | 9.8862E−01 | −6.7812E−01 | 1.7425E−01 |
| S5 | −3.7861E−01 | 1.5992E+00 | −3.8360E+00 | 5.1764E+00 | −4.1388E+00 | 1.7895E+00 | −3.2097E−01 |
| S6 | −9.9030E−01 | 2.3804E+00 | −4.3904E+00 | 5.0812E+00 | −3.5072E+00 | 1.3009E+00 | −1.9583E−01 |
| S7 | −8.2386E−02 | 4.6789E−02 | −3.8233E−01 | 4.2097E−01 | −1.8880E−01 | 3.9053E−02 | −3.0972E−03 |
| S8 | 2.1562E−01 | −5.1489E−01 | 4.2792E−01 | −2.1444E−01 | 6.4915E−02 | −1.0635E−02 | 7.1184E−04 |

Table 24 gives the effective focal lengths f1-f4 of the lenses in Embodiment 8, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 24

| f1 (mm) | −6.42 | f (mm) | 2.84 |
|---|---|---|---|
| f2 (mm) | 2.42 | TTL (mm) | 4.00 |
| f3 (mm) | −1.87 | ImgH (mm) | 2.07 |
| f4 (mm) | 1.25 | | |

Figure 16A:
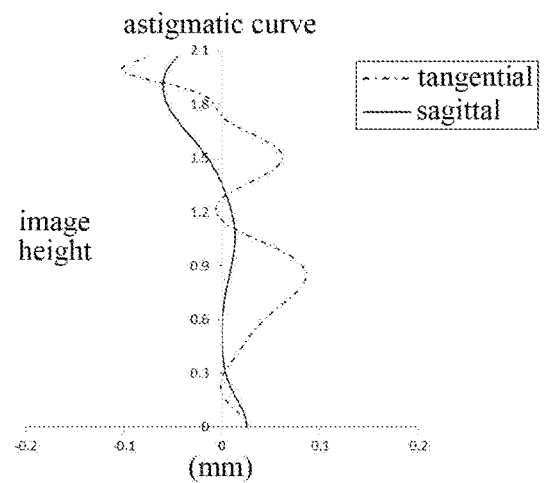
FIGS. 16A-16C respectively illustrate an astigmatic curve, a distortion curve and a lateral color curve of the optical imaging system according to Embodiment 8.
Figure 16B:
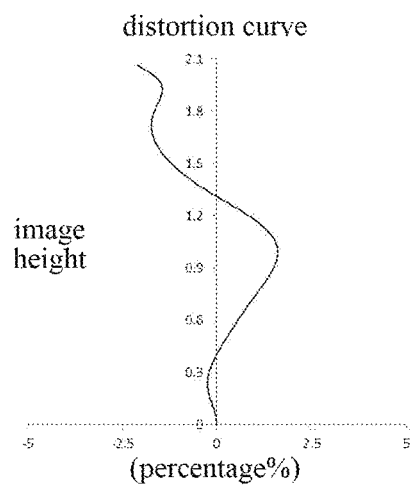
Figure 16C:
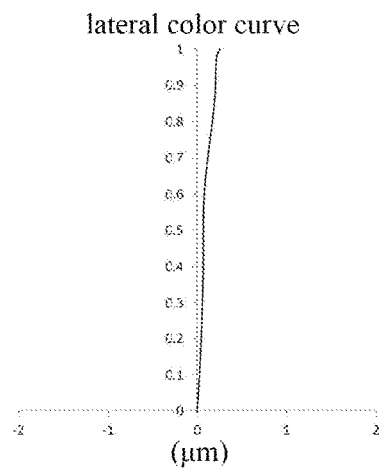

FIG. 16A illustrates the astigmatic curve of the optical imaging system according to Embodiment 8, representing a curvature of the tangential image plane and a curvature of the sagittal image plane. FIG. 16B illustrates the distortion curve of the optical imaging system according to Embodiment 8, representing amounts of distortion at different viewing angles. FIG. 16C illustrates the lateral color curve of the optical imaging system according to Embodiment 8, representing deviations of different image heights on the image plane after light passes through the system. It can be seen from FIGS. 16A-16C that the optical imaging system according to Embodiment 8 can achieve a good imaging quality.

Embodiment 9

Figure 17:
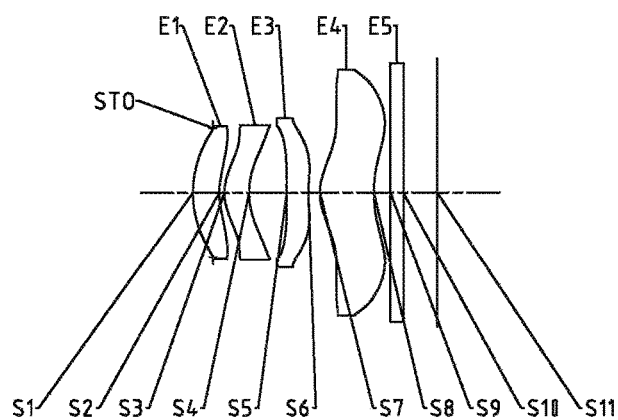
FIG. 17 is a schematic structural diagram illustrating an optical imaging system according to Embodiment 9 of the present disclosure.

An optical imaging system according to Embodiment 9 of the present disclosure is described below with reference to FIGS. 17-18C. FIG. 17 is a schematic structural diagram illustrating the optical imaging system according to Embodiment 9 of the present disclosure.

As shown in FIG. 17, the optical imaging system according to the exemplary implementations of the present disclosure sequentially includes, from the object side to the image side along the optical axis: a diaphragm STO, a first lens E1, a second lens E2, a third lens E3, a fourth lens E4, an optical filter E5 and an image plane S11.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The optical filter E5 has an object-side surface S9 and an image-side surface S10. The optical filter E5 may be an infrared bandpass filter and a bandpass waveband of the optical filter E5 may be about 750 nm to about 1000 nm, and further, the bandpass waveband may be about 850 nm to about 940 nm. Light from an object sequentially passes through the surfaces S1-S10 and finally forms an image on the image plane S11.

Table 25 shows the surface type, the radius of curvature, the thickness, the material and the conic coefficient of each lens of the optical imaging system in Embodiment 9. The radius of curvature and the thickness are shown in millimeters (mm).

TABLE 25

| | | | | material | | |
|---|---|---|---|---|---|---|
| surface number | surface type | radius of curvature | thickness | refractive index | abbe number | conic coefficient |
| OBJ | spherical | infinite | 350.0000 | | | |
| STO | spherical | infinite | −0.3250 | | | |
| S1 | aspheric | 1.6963 | 0.4311 | 1.62 | 23.5 | −2.2427 |
| S2 | aspheric | 1.1858 | 0.0817 | | | −10.3853 |
| S3 | aspheric | 0.7807 | 0.4055 | 1.53 | 55.8 | −2.7687 |
| S4 | aspheric | 1.3441 | 0.6136 | | | −3.1520 |
| S5 | aspheric | 16.3851 | 0.3633 | 1.53 | 55.8 | −99.0000 |
| S6 | aspheric | 1.4746 | 0.1863 | | | −42.0643 |
| S7 | aspheric | 0.7459 | 0.8842 | 1.53 | 55.8 | −5.8222 |
| S8 | aspheric | 2.2689 | 0.2695 | | | −24.2922 |
| S9 | spherical | infinite | 0.2100 | 1.52 | 64.2 | |
| S10 | spherical | infinite | 0.5548 | | | |
| S11 | spherical | infinite | | | | |

As may be seen from Table 25, in Embodiment 9, the object-side surface and the image-side surface of any one of the first lens E1 to the fourth lens E4 are aspheric surfaces. Table 26 shows the high-order coefficients of the aspheric surfaces applicable in Embodiment 9. Here, the surface types of the aspheric surfaces may be defined by the formula (1) given in the above Embodiment 1.

TABLE 26

| surface number | A4 | A6 | A8 | A10 | A12 | A14 | A16 |
|---|---|---|---|---|---|---|---|
| S1 | −8.6268E−03 | 1.8135E−01 | −4.1026E−01 | 6.5354E−01 | −6.5960E−01 | 3.5488E−01 | −7.9136E−02 |
| S2 | −2.0621E−01 | 4.4886E−01 | −7.4496E−01 | 6.4797E−01 | −2.9165E−01 | 5.5565E−02 | −1.0031E−03 |
| S3 | −3.1357E−01 | 1.0089E+00 | −2.5547E+00 | 2.9801E+00 | −1.8227E+00 | 6.1160E−01 | −9.1488E−02 |
| S4 | 2.8119E−01 | −6.1026E−01 | 6.1193E−01 | −8.0047E−01 | 1.0123E+00 | −6.6440E−01 | 1.6767E−01 |
| S5 | −4.7619E−01 | 1.7026E+00 | −3.9065E+00 | 5.2315E+00 | −4.1411E+00 | 1.7975E+00 | −3.3525E−01 |
| S6 | −9.4663E−01 | 2.3214E+00 | −4.3221E+00 | 5.0489E+00 | −3.4822E+00 | 1.2961E+00 | −1.9721E−01 |
| S7 | 1.6782E−02 | −1.3917E−01 | 4.3572E−02 | 3.2320E−02 | −2.3334E−02 | 5.3079E−03 | −4.1906E−04 |
| S8 | 2.9019E−01 | −5.0161E−01 | 3.8861E−01 | −1.8595E−01 | 5.4264E−02 | −8.6840E−03 | 5.7636E−04 |

Table 27 gives the effective focal lengths f1-f4 of the lenses in Embodiment 9, the total effective focal length f of the optical imaging system, the distance TTL from the center of the object-side surface S1 of the first lens E1 to the image plane S11 on the optical axis, and the half of the diagonal length ImgH of the effective pixel area on the image plane S11.

TABLE 27

| f1 (mm) | −9.43 | f (mm) | 2.84 |
|---|---|---|---|
| f2 (mm) | 2.84 | TTL (mm) | 4.00 |
| f3 (mm) | −3.11 | ImgH (mm) | 2.09 |
| f4 (mm) | 1.76 | | |

Figure 18A:
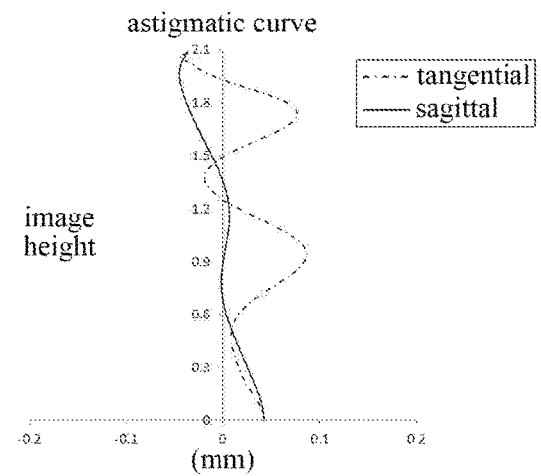
FIGS. 18A-18C respectively illustrate an astigmatic curve, a distortion curve and a lateral color curve of the optical imaging system according to Embodiment 9.
Figure 18B:
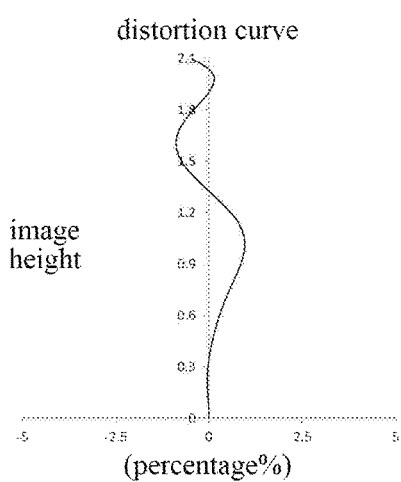
Figure 18C:
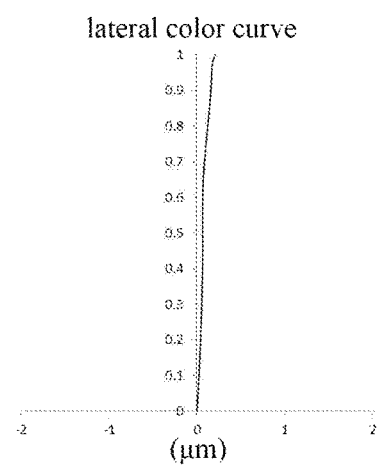

FIG. 18A illustrates the astigmatic curve of the optical imaging system according to Embodiment 9, representing a curvature of the tangential image plane and a curvature of the sagittal image plane. FIG. 18B illustrates the distortion curve of the optical imaging system according to Embodiment 9, representing amounts of distortion at different viewing angles. FIG. 18C illustrates the lateral color curve of the optical imaging system according to Embodiment 9, representing deviations of different image heights on the image plane after light passes through the system. It can be seen from FIGS. 18A-18C that the optical imaging system according to Embodiment 9 can achieve a good imaging quality.

To sum up, Embodiments 1-9 respectively satisfy the relationships shown in Table 28.

TABLE 28

| conditional expression | embodiment | | | | | | | | |
|---|---|---|---|---|---|---|---|---|---|
| | 1 | 2 | 3 | 4 | 5 | 6 | 7 | 8 | 9 |
| f/EPD | 1.34 | 1.34 | 1.39 | 1.58 | 1.37 | 1.39 | 1.37 | 1.39 | 1.34 |
| TTL/EPD | 1.88 | 1.88 | 1.96 | 2.23 | 1.93 | 1.96 | 1.93 | 1.95 | 1.89 |
| CT4/CT1 | 1.56 | 1.56 | 3.28 | 3.41 | 2.84 | 1.97 | 2.11 | 2.54 | 2.05 |
| f1/f | −3.53 | −3.04 | −2.67 | −2.33 | −2.54 | −2.36 | −3.81 | −2.26 | −3.32 |
| f4/f2 | 0.63 | 0.68 | 0.62 | 0.64 | 0.60 | 1.05 | 0.48 | 0.52 | 0.62 |
| f3/R5 | −0.65 | −0.62 | −0.20 | 0.16 | 0.08 | −0.13 | −0.12 | −0.27 | −0.19 |
| (R7 + R8)/(R7 − R8) | −2.47 | −2.49 | −1.64 | −1.62 | −2.03 | −4.57 | −1.78 | −1.79 | −1.98 |
| f2/CT2 | 9.26 | 8.78 | 6.01 | 5.64 | 6.22 | 5.80 | 7.23 | 5.58 | 7.00 |
| \|R1 + R2\|/\|R1 − R2\| | 5.48 | 5.00 | 5.32 | 4.92 | 5.52 | 4.56 | 6.30 | 4.90 | 5.65 |
| TTL/ΣAT | 3.97 | 4.02 | 4.23 | 4.74 | 3.97 | 4.69 | 4.53 | 4.23 | 4.54 |
| \|f/f3\| + \|f/f4\| | 2.57 | 2.48 | 2.85 | 3.01 | 2.93 | 1.56 | 3.28 | 3.79 | 2.53 |

The present disclosure further provides an imaging device, having a photosensitive element that may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging system, comprising sequentially, from an object side to an image side along an optical axis: a first lens, a second lens, a third lens, and a fourth lens,
    wherein the first lens has a negative refractive power;
    the second lens has a positive refractive power or a negative refractive power;
    the third lens has a positive refractive power or a negative refractive power, and an image-side surface of the third lens is a concave surface;
    the fourth lens has a positive refractive power, and an image-side surface of the fourth lens is a concave surface; and
    a total effective focal length f of the optical imaging system and an entrance pupil diameter EPD of the optical imaging system satisfy: f/EPD<1.60,
    wherein a distance TTL from a center of an object-side surface of the first lens to an image plane of the optical imaging system on the optical axis and a sum of spacing distances ΣAT of any two adjacent lenses among the first lens to the fourth lens on the optical axis satisfy: $3.5<TTL/\Sigma AT<5.0$.

2. The optical imaging system according to claim 1, wherein the optical imaging system further comprises an infrared bandpass filter disposed between the fourth lens and an image plane of the optical imaging system, and a bandpass waveband of the infrared bandpass filter is 750 nm to 1000 nm.

3. The optical imaging system according to claim 2, wherein the bandpass waveband of the infrared bandpass filter is 850 nm to 940 nm.

4. The optical imaging system according to claim 1, wherein the distance TTL from the center of the object-side surface of the first lens to the image plane of the optical imaging system on the optical axis and the entrance pupil diameter EPD of the optical imaging system satisfy: $1.0<TTL/EPD<2.5$.

5. The optical imaging system according to claim 1, wherein a center thickness CT1 of the first lens on the optical axis and a center thickness CT4 of the fourth lens on the optical axis satisfy: $1.0<CT4/CT1<3.5$.

6. The optical imaging system according to claim 1, wherein an effective focal length f1 of the first lens and the total effective focal length f of the optical imaging system satisfy: $-4.0<f1/f<-2.0$.

7. The optical imaging system according to claim 1, wherein an effective focal length f4 of the fourth lens and an effective focal length f2 of the second lens satisfy: $0<f4/f2<1.5$.

8. The optical imaging system according to claim 1, wherein an effective focal length f3 of the third lens and a radius of curvature R5 of an object-side surface of the third lens satisfy: $-1<f3/R5<0.5$.

9. The optical imaging system according to claim 1, wherein a radius of curvature R7 of an object-side surface of the fourth lens and a radius of curvature R8 of the image-side surface of the fourth lens satisfy: $-5.0<(R7+R8)/(R7-R8)<-1.0$.

10. The optical imaging system according to claim 1, wherein an effective focal length f2 of the second lens and a center thickness CT2 of the second lens on the optical axis satisfy: $5.0<f2/CT2<10.0$.

11. The optical imaging system according to claim 1, wherein a radius of curvature R1 of the object-side surface of the first lens and a radius of curvature R2 of an image-side surface of the first lens satisfy: $4.0<|R1+R2|/|R1-R2|<7.0$.

12. The optical imaging system according to claim 1, wherein the total effective focal length f of the optical imaging system, an effective focal length f3 of the third lens, and an effective focal length f4 of the fourth lens satisfy: $1.0<|f/f3|+|f/f4|<4.0$.

* * * * *